United States Patent
Anderson et al.

(10) Patent No.: US 12,067,813 B2
(45) Date of Patent: Aug. 20, 2024

(54) SENSOR QUALITY DETECTION

(71) Applicant: Rockwell Collins, Inc., Cedar Rapids, IA (US)

(72) Inventors: Ross D. Anderson, Lakeville, MN (US); Subhashish Chakravarty, Marion, IA (US); Matthew M. Lorch, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 269 days.

(21) Appl. No.: 17/164,354

(22) Filed: Feb. 1, 2021

(65) Prior Publication Data

US 2022/0245975 A1    Aug. 4, 2022

(51) Int. Cl.
| | | |
|---|---|---|
| G07C 5/08 | (2006.01) | |
| B60W 50/02 | (2012.01) | |
| G01M 99/00 | (2011.01) | |
| G05B 23/02 | (2006.01) | |
| G07C 5/00 | (2006.01) | |

(52) U.S. Cl.
CPC ....... *G07C 5/0808* (2013.01); *B60W 50/0205* (2013.01); *G01M 99/008* (2013.01); *G05B 23/0205* (2013.01); *G07C 5/006* (2013.01); *G07C 5/008* (2013.01); *G07C 5/0816* (2013.01)

(58) Field of Classification Search
CPC .. G07C 5/0808; G08G 5/0008; G01S 17/931; G01S 17/86
See application file for complete search history.

(56) References Cited

U.S. PATENT DOCUMENTS

| | | | |
|---|---|---|---|
| 7,260,501 B2 | 8/2007 | Pattipatti et al. | |
| 7,421,419 B2 | 9/2008 | Maren | |
| 8,423,224 B1 | 4/2013 | Fuciarelli et al. | |
| 8,571,904 B2 | 10/2013 | Guru et al. | |
| 9,424,694 B2 | 8/2016 | Senalp et al. | |
| 10,124,893 B1 | 11/2018 | Aalund et al. | |

(Continued)

FOREIGN PATENT DOCUMENTS

| | | |
|---|---|---|
| DE | 102018127059 A1 | 4/2020 |
| EP | 2028609 A2 | 2/2009 |

(Continued)

OTHER PUBLICATIONS

Extended Search Report in European Application No. 22150710.6 dated Jul. 25, 2022, 7 pages.

*Primary Examiner* — Vivek D Koppikar
*Assistant Examiner* — Godfrey Aleksander Maciorowski
(74) *Attorney, Agent, or Firm* — Kinney & Lange, P.A.

(57) ABSTRACT

A system and method for sensor quality detection continuously monitors a context (vehicle state, proximal environmental factors, surrounding environmental conditions) surrounding a vehicle as well as actual sensor output. The system compares actual sensor output with expected sensor output to determine if the sensor has become degraded or if the degradation is due to the surrounding context. Once the system determines the context-based or actual degradation, it determines if the sensor is able to complete an assigned tasking with the degradation within the specific mission-based requirements of the sensor. Should the degraded sensor be unable to complete the task, the system transfers the tasking to a second vehicle equipped with an operational sensor.

15 Claims, 5 Drawing Sheets

(56) References Cited

U.S. PATENT DOCUMENTS

| | | |
|---|---|---|
| 10,401,857 B2 | 9/2019 | Wang et al. |
| 10,502,584 B1 | 12/2019 | Suiter et al. |
| 10,676,048 B2 | 6/2020 | Dixit et al. |
| 10,810,501 B1 | 10/2020 | Kimchi et al. |
| 10,814,883 B1 | 10/2020 | Dixit |
| 10,964,130 B1 | 3/2021 | Dixit |
| 2003/0060942 A1 | 3/2003 | Kotzev et al. |
| 2006/0025910 A1* | 2/2006 | Hayashi ............... B60T 8/885 701/30.5 |
| 2010/0326264 A1 | 12/2010 | Roemerman et al. |
| 2011/0029804 A1* | 2/2011 | Hadden ............ G05B 19/41865 714/E11.002 |
| 2014/0279809 A1 | 9/2014 | Hershey et al. |
| 2015/0025927 A1 | 1/2015 | Hershey et al. |
| 2015/0186335 A1 | 7/2015 | Senalp et al. |
| 2017/0295031 A1 | 10/2017 | Bush et al. |
| 2017/0357263 A1* | 12/2017 | Glatfelter ............ G06F 18/22 |
| 2018/0019530 A1 | 1/2018 | Fu et al. |
| 2018/0203100 A1 | 7/2018 | McKitterick |
| 2018/0362190 A1 | 12/2018 | Chambers et al. |
| 2019/0027047 A1 | 1/2019 | Kim et al. |
| 2019/0051063 A1* | 2/2019 | Tatourian ............. G07C 5/0808 |
| 2019/0176862 A1 | 6/2019 | Kumar et al. |
| 2019/0187727 A1 | 6/2019 | Reepmeyer et al. |
| 2019/0215338 A1 | 7/2019 | Baggeroer et al. |
| 2019/0235500 A1 | 8/2019 | O'Brien et al. |
| 2020/0273350 A1 | 8/2020 | Litvova et al. |
| 2022/0075693 A1 | 3/2022 | Mitani et al. |
| 2022/0101733 A1 | 3/2022 | Dunlay et al. |

FOREIGN PATENT DOCUMENTS

| | | |
|---|---|---|
| EP | 2323005 B1 | 11/2016 |
| GB | 2450241 A | 12/2008 |
| KR | 101750875 B1 | 6/2017 |
| WO | 2020163781 A1 | 8/2020 |

* cited by examiner

SENSOR QUALITY DETECTION

CROSS-REFERENCE TO RELATED APPLICATIONS

The present application is related to U.S. nonprovisional application Ser. No. 17/035,416 filed on 28 Sep. 2020 entitled "Mission Reasoner System and Method" the contents of which is herein incorporated by reference in its entirety.

BACKGROUND

Determining the ability to complete a tasking may require an accurate assessment of capabilities for both the vehicle itself, as well as installed equipment. Monitoring of sensors for sensor availability and effectiveness may be critical awareness information regarding an ability to complete a tasking or adjust to completing an alternate tasking.

Any uncertainty regarding sensor capability may cause undesirable results including a partially operational sensor being unused or a tasking canceled due to an unknown sensor ability. A smudged or degraded high resolution camera may still be able to capture an image that is adequate for the assigned tasking. Without this knowledge, a decision maker may be unable to accurately assess operational capabilities and ultimately make an incorrect decision.

An indication of a failed or degraded sensor at vehicle start up may be merely due to an external circumstance and creating an illusion of failure when a sensor may be sufficient for one or more operations.

Therefore, a need remains for a system and related method which may overcome these limitations and provide a novel solution to detect a context driven quality of a specific sensor allowing for accurate decisions for sensor and vehicle operation.

SUMMARY

In one aspect, embodiments of the inventive concepts disclosed herein are directed to a system for sensor quality detection. The system may comprise a sensor sited onboard a first vehicle and a state sensor onboard the first vehicle configured to measure a state variable associated with the first vehicle.

To detect surrounding weather, the system may include an environmental sensor onboard the first vehicle configured to measure an environmental condition proximal with the first vehicle and to maintain awareness of environment, the system may include a database of environmental factors onboard the first vehicle associated with an expected performance of the sensor, the expected performance based on an environmental factor within the database of environmental factors. The system may include a communication system onboard the first vehicle, the communication system configured at least to receive the environmental condition.

For function, the system may include a controller operatively coupled with the sensor, the state sensor, the environmental sensor, the database of environmental factors, and the communication system. The controller may couple with a tangible, non-transitory memory configured to communicate with the controller, the tangible, non-transitory memory having instructions stored therein that, in response to execution by the controller, cause the controller to carry out each function of the system for sensor quality detection.

One function of the system for sensor quality detection may include receive a current tasking of the first vehicle, the current tasking defined as a task assigned to the first vehicle and receive, from the state sensor, the state variable of the first vehicle. The controller may also receive from the environmental sensor the environmental condition and receive from the database of environmental factors, the environmental factor.

The controller may determine an expected output from the sensor based on each of: 1) the current tasking, 2) the received state variable of the first vehicle, 3) the received environmental condition, and 4) the environmental factor and receive an actual output from the sensor. To determine if a problem may exist, the controller may compare the actual output to the expected output and quantify a degradation of the sensor based on the comparison. The controller may then determine a sensor effectiveness of the sensor based on the quantified degradation and the task assigned to the first vehicle and determine a mission health of the current tasking based on the 1) the sensor effectiveness of the sensor, 2) the state variable of the first vehicle, 3) the environmental condition, 4) the environmental factor, and 5) the current tasking, the mission health a measurement of sensor effectiveness in completing the current tasking with the quantified degradation of the sensor.

Should the sensor degradation be too great, the controller may transfer the current tasking to a second vehicle having an operational sensor capable of performing the current tasking if the determined mission health falls below a predetermined value.

A further embodiment of the inventive concepts disclosed herein may include a method for sensor quality detection. The method may comprise receiving, onboard a first vehicle, a current tasking assigned to the first vehicle, the current tasking including a task assigned to the first vehicle, the current tasking associated with an employment of a sensor onboard the first vehicle and receiving, onboard the first vehicle, a state variable associated with the first vehicle.

The method may also include receiving, onboard the first vehicle, an environmental condition proximal with the first vehicle, the environmental condition one of: received via a communication system onboard the first vehicle and sensed by an environmental sensor onboard the first vehicle and querying a database of environmental factors, onboard the first vehicle, for an environmental factor.

The method may further include determining an expected output from the sensor onboard the first vehicle based on each of: 1) the current tasking, 2) the received state variable of the first vehicle, 3) the received environmental condition, and 4) the environmental factor and receiving an actual output from the sensor.

The method may include comparing the actual output to the expected output, quantifying a degradation of the sensor based on the comparison, and determining a sensor effectiveness of the sensor based on the quantified degradation and the task assigned to the first vehicle.

Further, the method may include determining a mission health of the current tasking based on 1) the sensor effectiveness of the sensor, 2) the state variable of the first vehicle, 3) the environmental condition, 4) the environmental factor, and 5) the current tasking, the mission health a measurement of sensor effectiveness in completing the current tasking with the quantified degradation of the sensor and transferring the current tasking to a second vehicle having an operational sensor capable of performing the current tasking if the determined mission health falls below a predetermined value.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

As used herein the term "approximately" in claim language as well as specification language may refer to a range of values plus or minus twenty percent (+/−20%) of the claimed value. For example, "approximately 100" may refer to, and therefore claim, the range of 80 to 120.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method for sensor quality detection. The system continuously monitors a context (vehicle state, proximal environmental factors, surrounding environmental conditions) surrounding a vehicle as well as actual sensor output. The system compares actual sensor output with expected sensor output to determine if the sensor has become degraded or if the degradation is due to the surrounding context. Once the system determines the context-based or actual degradation, it determines if the sensor is able to complete an assigned task with the degradation within the specific tasking-based requirements of the sensor. Should the degraded sensor be unable to complete the task, the system transfers the tasking to a second vehicle equipped with an operational sensor.

REFERENCE CHART

| | |
|---|---|
| 100 | System for Sensor Quality Detection |
| 110 | Vehicle (first, second, n) |
| 112 | Vehicle State Sensors |
| 114 | Environmental Factors Database |
| 116 | Environmental Conditions Sensors |
| 118 | Context Factors |
| 120 | Controller |
| 122 | Sensor |
| 124 | Memory |
| 126 | Communication System |
| 132 | Vehicle State Variables |
| 134 | Environmental Factors |
| 136 | Environmental Conditions |
| 200 | Scenario Diagram |
| 210 | First Vehicle |
| 212 | First Vehicle Sensor |
| 214 | First Sensor Field of View (FOV) |

-continued

| | |
|---|---|
| 226 | Operator Communications |
| 228 | Command Comm Link |
| 230 | Second Vehicle |
| 232 | Second Vehicle Sensor |
| 234 | Second Sensor FOV |
| 240 | Command Asset |
| 250 | Objective |
| 300 | Logic Sequence |
| 302 | Sensor Output Knowledge Graph |
| 304 | Context Driven Fault Determination |
| 306 | Detection and Repair Tools |
| 308 | Quantify Degradation |
| 310 | Value of Sensor |
| 312 | Sensor Effectiveness |
| 314 | Mission Health |
| 316 | Repair/Replan |
| 400 | Logic Flow |
| 402 | Actual Sensor Output |
| 404 | Expected Sensor Output |
| 406 | Actual equal Expected |
| 408 | Continue Current Tasking |
| 410 | Quantify Sensor Degradation |
| 412 | Sensor Effectiveness |
| 414 | Sensor Evaluation |
| 416 | Transfer Current Tasking |
| 418 | Retask First Vehicle |
| 500 | Method Flow |

Figure 1:
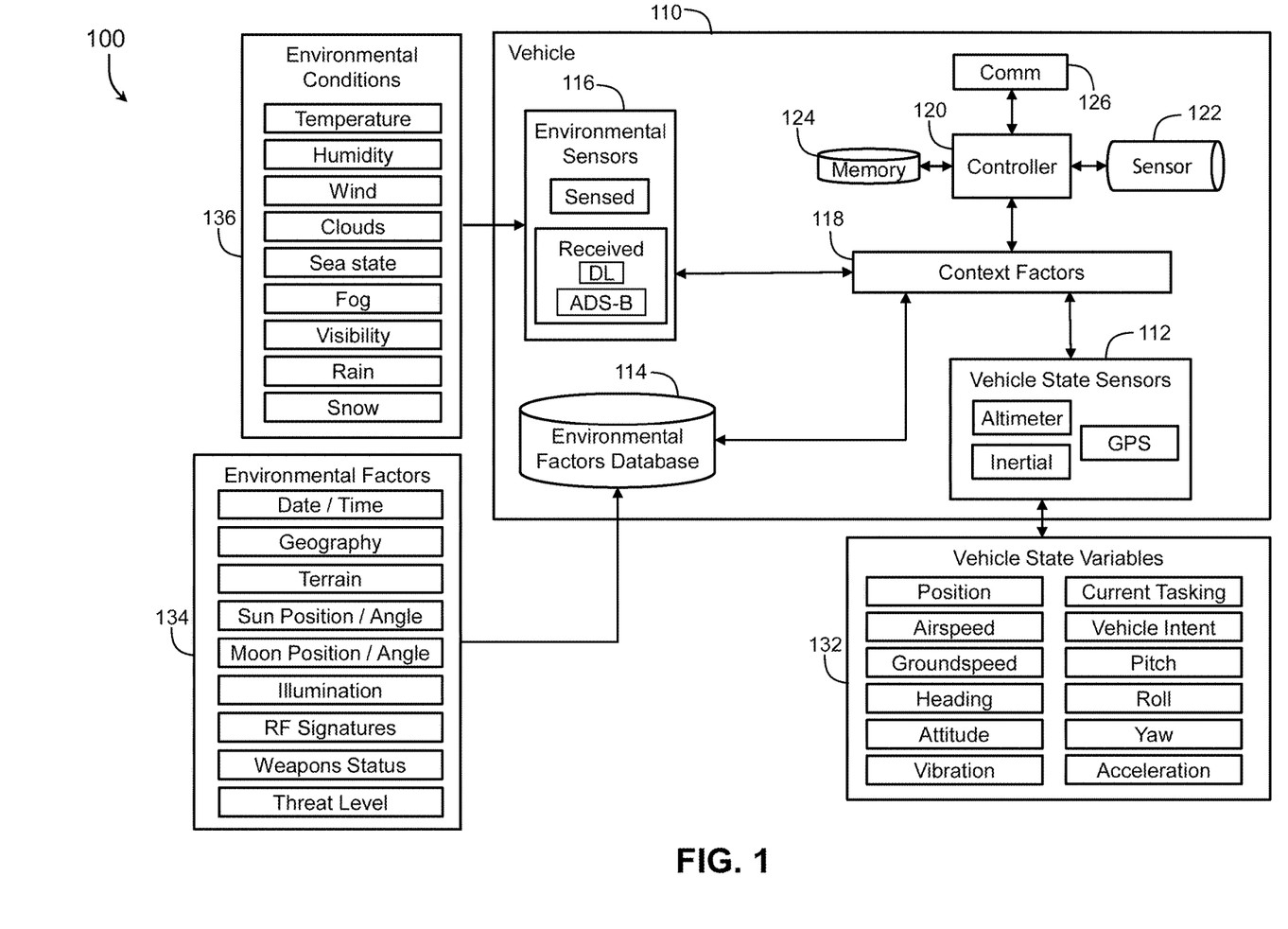
FIG. 1 is a diagram of a system for sensor quality detection in accordance with an embodiment of the inventive concepts disclosed herein.

FIG. 1

Referring to FIG. 1, a diagram of a system for sensor quality detection 100 in accordance with an embodiment of the inventive concepts disclosed herein is shown. Generally, a system for sensor quality detection 100 may include a controller 120, a sensor 122, a memory 124, and a communication system 126. The system for sensor quality detection 100 may be sited and operation onboard a vehicle 110.

The system for sensor quality detection 100 may be sited and functional onboard the vehicle 110 (first vehicle, second vehicle, n vehicle etc.) to which one or more of the sensors 122 is also coupled. In some embodiments, the vehicle may include any vehicle to which a sensor may be functional and assist the vehicle 110 in accomplishment of a current tasking. In one embodiment, the vehicle 110 may include a manned and unmanned aerospace vehicle (e.g., aircraft, spacecraft, satellite, etc.), a manned and unmanned surface vehicle, a manned and unmanned subsurface vehicle, a military vehicle, an aerospace vehicle, and a transport vehicle.

Additional examples of the first vehicle 110 may include an urban air mobility (UAM) vehicle, an unmanned aerial/ aircraft systems (UAS), a commercial air transport vehicle, a business air transport vehicle, an expeditionary modular autonomous vehicle (EMAV), and a field repair collaborative robotic vehicle (e.g., Cobot).

The sensor 122 may include any sensor functionally coupled with the vehicle 110 and configured to assist the vehicle 110 in performing the current tasking. In one embodiment of the inventive concepts disclosed herein, the sensor 122 may include an optical sensor, and electro optical sensor, an electromagnetic sensor, a radio frequency sensor, a laser imaging detection and ranging (LIDAR) sensor, a multi-spectral situational awareness sensor, a radar warning receiver (RWR), a laser warning receiver (LWR), a radio frequency countermeasures sensor (RFCM), a weather sensor, a pitot static sensor, a radar sensor, and an infrared (IR) sensor. Some exemplary sensors may also include a weather radar, electronically scanned arrays (ESA) sensors, atmospheric sensors (e.g., pressure, altimeter, etc.) In one embodiment, the sensor 122 may be as sophisticated as an optical and IR camera onboard a military unmanned aircraft system (UAS) (e.g., an autonomous helicopter). In another exemplary embodiment, the sensor 122 may be as simple as a rain sensor operational onboard a passenger auto.

In one embodiment of the inventive concepts disclosed herein, communication system 126 may include a bidirectional data communication, a data link (any frequency) and an automated dependent surveillance broadcast (ADS-B) capability.

In one embodiment of the inventive concepts disclosed herein, the controller 120 may function as a stand-alone processor onboard the vehicle and may include and/or be integrated with or a partition of an onboard mission computer (MC), flight management computer or system (FMS), or a flight control computer (FCC).

In one embodiment of the inventive concepts disclosed herein, the system for sensor quality detection 100 may employ a plurality of context factors 118 including those variables which may impact a performance of sensor 122 and its ability to accomplish a current tasking. Context factors 118 may include each of the sensed and received factors and conditions associated with the system for sensor quality detection 100 including a plurality of vehicle state variables 132 associated with the vehicle 110, one or more environmental factors 134 applicable to sensor performance, and one or more environmental conditions 136 surrounding the vehicle 110.

The system for sensor quality detection 100 may also include one or more state sensors 112 onboard the vehicle 110 configured to measure the plurality of state variables 132 associated with the vehicle 110. Some exemplary state sensors 112 may include an altimeter, an inertial sensor, a position sensor, a positioning system, a heading sensor, an airspeed sensor, a groundspeed sensor, and an attitude (pitch roll yaw) sensor.

Exemplary state variables 132 associated with the vehicle 110 may include a position (with reference to one or more datums), an airspeed, a ground speed, a heading (vehicle heading and sensor heading or pointing), an altitude (above ground level AGL and mean sea level MSL), a vibration (engine and airframe), a current tasking (and a task associated within the tasking), a vehicle intent, a pitch, a roll, a yaw, and an acceleration (three axis).

The system for sensor quality detection 100 may also include one or more environmental sensors 116 onboard the first vehicle 110 configured to measure the one or more environmental conditions 136 proximal with the vehicle 110. Environmental conditions 136 may be either sensed via an onboard sensor 116 as well as received via the communication system 126. Exemplary environmental sensors 116 may include a temperature sensor (e.g., ambient outside air temperature and total air temperature), a humidity sensor, and a visibility sensor. Additional environmental conditions 136 may be received via a radio frequency (RF) datalink as well as the ADS-B.

Some environmental conditions 136 proximal with the vehicle 110 and applicable to the sensor 122 performance may include temperature, a humidity, a wind, a cloud state, a sea state, a sea temperature, a water depth, a fog, a visibility, a rain event, and a snow event. For example, a surface fog layer limiting visibility to one quarter of a mile during sensor 122 start up on the ground may be directly applicable to the performance of the sensor 122. In this example, the system for sensor quality detection 100 may tolerate limited sensor 122 performance due to the fog received via ADS-B.

The system for sensor quality detection 100 may further include a database of environmental factors 114 onboard the vehicle 110 associated with an expected performance of the sensor 122, the expected performance based on the environmental factor 134 within the database of environmental factors.

Some exemplary environmental factors 134 may include a date, a time, a geography, a terrain, a relative sun position and angle, a relative moon position and angle, a threat level (e.g., high threat, low threat, etc.), an engagement status (e.g., free fire, visual identification, weapons hold, etc.), an illumination, and a radio frequency signature. Each environmental factor 134 may directly impact the performance of the sensor 122 and therefore, be a useful tool in evaluating and determining an expected sensor 122 performance. For example, a sun angle in direct field of view of a visual (e.g., camera) sensor 122 may directly and adversely affect the sensor 122 performance. Here, the system for sensor quality detection 100 may tolerate a sensor inability to focus should the sensor 122 be pointed at the sun.

In one embodiment, inter-connections between these context factors 118 may enable the controller 120 to perform more efficiently over time. These inter-connections may be expressed/learned from data as network graphs (i.e. graph theory) to enable a more accurate assessment of sensor performance with time. For example, a state variable of night combined with an environmental condition of fog may lead the controller 120 to expect a poor performance from the sensor 122. Conversely, a state variable of night combined with an environmental factor of a full moon may cause the controller to determine an excellent sensor performance.

In one embodiment of the inventive concepts disclosed herein, the controller 120 may operatively couple with each of the sensor, the state sensor, the environmental sensor, the database of environmental factors, and the communication system to carry out each function of the system for sensor quality detection 100.

To enable such function, the system for sensor quality detection 100 may include a tangible, non-transitory memory 124 configured to communicate with the controller 120, the tangible, non-transitory memory 124 having instructions stored therein that, in response to execution by the controller, cause the controller to perform each task associated with the system for sensor quality detection 100 function.

System Function

In one embodiment of the inventive concepts disclosed herein, the controller 120 may receive a current tasking of the first vehicle 110, the current tasking task assigned to the first vehicle 110. In one embodiment, the current tasking may be received via the communication system 126, manually input to the controller 120, as well as via data link input to the controller 120. As current tasking may change over time, it may be a portion of the vehicle state variables 132 as well as a variable received by the controller 120.

In some embodiments, the current tasking may include any assignment of which the vehicle 110 may be capable and tasked. Some current tasking types may include a transport mission, a surveillance mission, a combat mission, a mapping mission, and a reconnaissance mission. As some specific sensor types may be tailored to a specific tasking, the size and capabilities of the vehicle 110 may determine a tasking type. For example, a heavy transport aircraft with a radar sensor and an IR sensor may be suitable for a transport mission while a small UAS equipped with a visual and IR sensor suite may be suitable for a surveillance mission.

The controller 120 may also receive, from one or more state sensors 112, the one or more state variables 132 of the vehicle 110 for determination of the state of the vehicle having an impact on sensor 122 performance. Similarly, as another variable to sensor 122 performance, the controller 120 may also receive from the environmental sensor 116 the environmental condition 136 proximal with the vehicle 110. Also, the controller 120 may receive from the database of environmental factors 114, the one or more environmental factors 134.

In one embodiment of the inventive concepts disclosed herein, the controller 120 may continuously receive these variables. As continuous performance may be desirable for continued successful operation and tasking success and, as conditions and variables may change over time and position, the controller 120 may function to continuously query each of the vehicle state variables 132, the environmental factors 134 and the environmental conditions 136 to ensure it uses the most up to date information in determining sensor 122 performance.

With each of these variables in place, the controller 120 may then continuously determine an expected output from the sensor 122 based on each of: 1) the current tasking, 2) the received state variable of the first vehicle, 3) the received environmental condition, and 4) the environmental factors. For example, during day time (environmental factor 134) flight in a fixed wing UAS vehicle 110 at 10,000 ft MSL (state variable 132) under a cloud deck (environmental condition 136), a system for sensor quality detection 100 may expect near perfect performance from a visible spectrum sensor 122. Conversely, during night surface driving of a surface-based vehicle 110, with a surface visibility of ½ statute miles, the system for sensor quality detection 100 may expect a different (likely lower) level of performance from a visual sensor 122.

In one embodiment, the expected output of the sensor may further include a scaled sensor anticipated performance based on the environmental factor. For example, one environmental factor may include an illumination level of a flat terrain over which the vehicle 110 may be operating. One scaled sensor anticipated performance may include a scale from 1 to 10 of expected sensor 122 performance over the moonlit flat terrain. Here, the controller 120 may declare a higher scale of 9 out of 10 in anticipation of a clear picture of illuminated terrain.

In one embodiment of the inventive concepts disclosed herein, the controller 120 may receive an actual output from the sensor 122 and compare the actual output to the expected output to enable to controller 120 to quantify a degradation of the sensor 122 based on the comparison. Here, the controller 120 may periodically sample a data stream from the sensor 122 to the MC as well as function as the MC and receive each data stream from each sensor 122.

In quantifying the degradation, the controller 120 may quantify using a scaled score of the actual output from the sensor based on an actual sensor performance to communicate the quantified degradation to another entity for further use. In one embodiment, the controller 120 may employ a 0 to 100 scale of sensor performance to quantify the degradation. For example, should the controller 120 determine the sensor 122 may function at 25% of a normal function, the controller 120 may assign a degradation of 25 to the sensor 122.

In one embodiment of the inventive concepts disclosed herein, the controller 120 may determine a sensor effectiveness of the sensor 122 based on the quantified degradation and the assigned task to determine if the sensor may be effective in completing a current task associated with the current tasking. For example, should a current tasking include a task of lasing a target for weapons employment, and the sensor 122 degradation may be at 25 since an exemplary IR receiver may be inoperative, the sensor effectiveness may be insufficient for a night operation but capable of a lasing operation. In this manner, the sensor effectiveness may be based not only on the sensor capabilities but also on the assigned task (here, passive IR sensing vs active lasing).

In one embodiment of the inventive concepts disclosed herein, the controller 120 may determine a mission health of the current tasking based on each of the 1) the sensor effectiveness of the sensor 122, 2) the state variable 132 of the vehicle 110, 3) the environmental condition 136, 4) the environmental factor 134, and 5) the current tasking assigned to the vehicle 110. In one embodiment, the mission health may be defined as a measurement of sensor 122 effectiveness in completing the current tasking with the quantified degradation of the sensor 122.

In one embodiment, the controller 120 may also assign a scaled measurement of overall mission health on a numeric scale (e.g., 0-100). Here, the controller 120 may fix one exemplary pass-fail point at a numeric mission health of 50 depending on the context 118 and the specific tasks assigned to the vehicle 110.

Should the sensor be capable of accomplishing at least part of the tasking (e.g., one or more individual tasks) the controller 120 may continue with the vehicle 110 assigned to the current tasking. However, should the controller 120 determine the sensor 122 may not be able to complete one or more tasks and the determined mission health falls below a predetermined value, the controller 120 may transfer the current tasking to a second vehicle having an operational sensor capable of performing the current tasking.

For example, should an optical sensor 122 be unable to focus with clear weather and day operation, the controller 120 may determine a mission health at or near zero and assign the current tasking to the second vehicle having an operational optical sensor.

Figure 2:
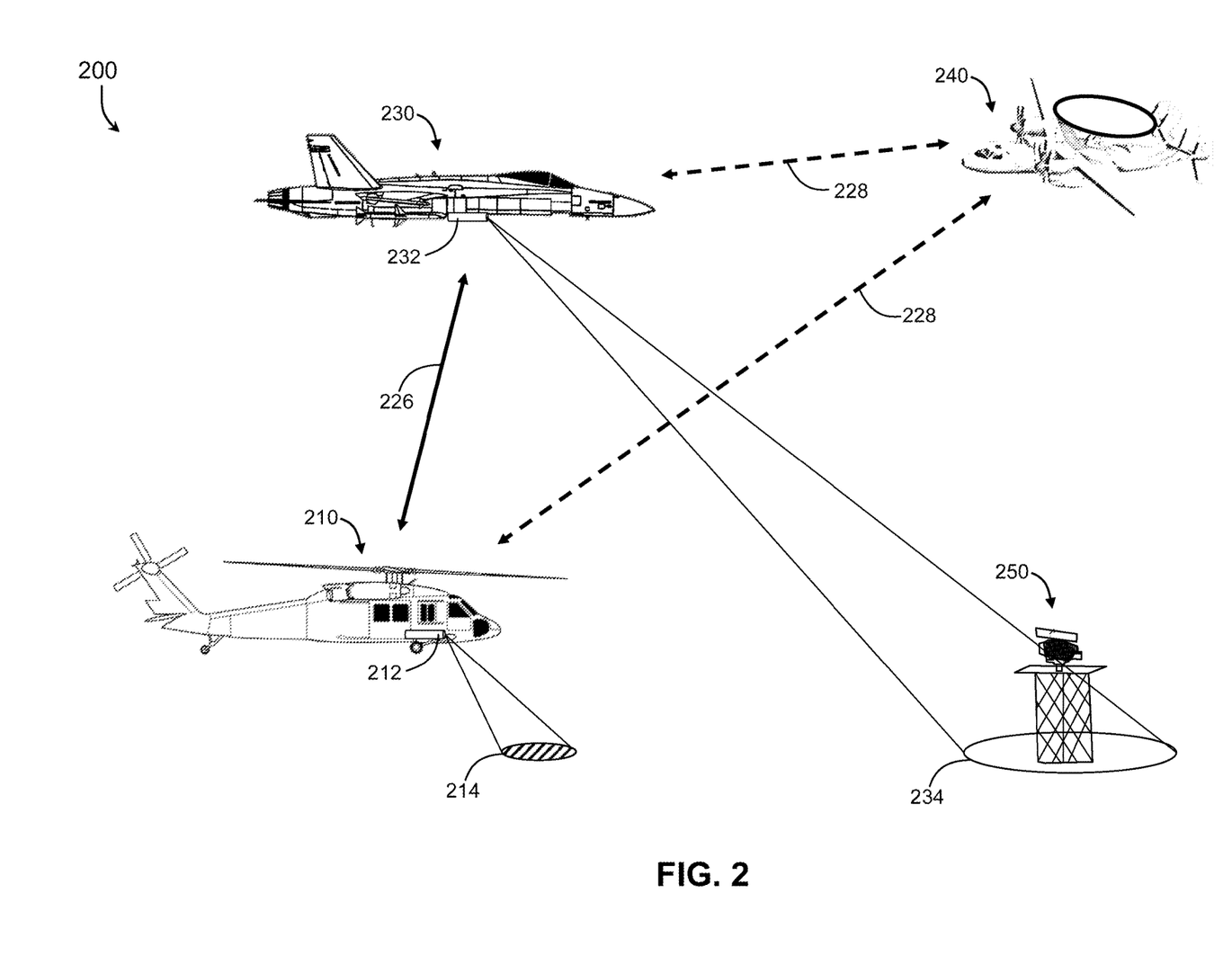
FIG. 2 is a diagram of an exemplary scenario in accordance with an embodiment of the inventive concepts disclosed herein.

FIG. 2

Referring now to FIG. 2, a diagram of an exemplary scenario 200 in accordance with an embodiment of the inventive concepts disclosed herein is shown. A first vehicle 210 may be assigned a current tasking using a first vehicle sensor 212 with a first sensor field of view (FOV) 214 to illuminate an objective 250.

However, the surrounding context factors 118 of the first vehicle 210 may preclude the first vehicle 210 from illuminating the objective 250. The controller 120 may determine the mission health with the first vehicle assigned the current tasking at zero and transfer the current tasking via an operator communication 226 to a second vehicle 230 having an operational second vehicle sensor 232 with a second sensor FOV 234 able to illuminate the objective 250.

In one embodiment, the controller 120 may autonomously determine the mission health and transfer the tasking to the second vehicle 230. In addition, the controller 120 may communicate with a command asset 240 for additional decision making and a collaboration with an offboard mission reasoner via the communication system 126 to score available assets to accomplish the current tasking. Via the communication system 126 and, the controller 120 may communicate the mission health via command comm link 228 to the command asset 240 and await further instructions.

In another example, with context factors 118 of flying over an ocean during the day, the context of the environment may drive the controller 120 to determine an expected sensor output to be something that appears blue with waves moving below. Should the actual sensor output indicate black, the controller 120 may determine the sensor 122 (camera) has failed. An actual sensor output including a static image may indicate the sensor 122 (camera) output has frozen. An actual sensor output including a gray circle may lead the controller 120 to determine debris or smudges on the lens and evaluate the sensor 122 effectiveness based on the degradation quantification.

In another example, a UAS vehicle 110 may be assigned a task to fly from point A to B and deliver a cargo. A LIDAR sensor onboard the vehicle 110 may have failed and ceased to provide any sensor actual output however an additional RF sensor may be operational. To ensure UAS avoids any overhead electrical or communications wires, the controller 120 may command the vehicle 110 to discontinue reliance on LIDAR data for collision avoidance of aerial objects. The controller 120 may command use of a collaborative approach to sensor data and the operating environment, and use RF sensor receiving known RF signatures of wires to ensure the UAS vehicle 110 avoids the electrical wires.

In an additional example, two autonomous UASs are assigned the current tasking to search a grass field and corn field for a missing person. Each UAS is equipped with a conventional camera and a thermal camera. Either camera is capable of searching the grass field, however the thermal camera is required for searching the corn field. UAS-2 starts searching the corn field using its thermal camera. While searching actual sensor data from the thermal camera change to black. Using context factors 118 surrounding the UAS-2 (moving, over land, and temperatures are within sensitivity range of the thermal camera), the controller 120 onboard UAS-2 detects its thermal camera has failed and it is no longer capable of searching the corn field. The controller 120 communicates the sensor failure onboard UAS-2 to UAS-1 and transfers the cornfield search task to the UAS-1 as UAS-1 is capable of searching the corn field. The controller 120 then functions to retask the UAS-2 to search the grass field as the sensor onboard UAS-2 is still capable of searching this field using the conventional camera.

An additional example may indicate a scenario where a partially degraded sensor may continue with the current tasking. An autonomous UAS is tasked to search a farm field using an onboard conventional camera. The actual sensor output indicates debris is detected on the camera lens. The controller 120 may assesses if the quality of the resulting images will be sufficient to complete the search. The controller 120 determines if the images are cropped to remove the debris from the generated image, and the images are taken more frequently to compensate for the cropping, such a mitigation may allow the search to proceed with debris on the lens and the mission health is sufficient to complete the current tasking. Alternatively, the controller 120 may function to compensate using additional mitigation techniques to compensate for the visual occlusion and is able to complete the task.

In another example, a transport UAS may be assigned an operation to fly from point A to point B in winter weather to retrieve a cargo. A landing at point B may require an operational infrared sensor to image the landing area at point B. Enroute to point B the controller 120 detects the image from the infrared sensor has frozen. The controller 120 may then retask the UAS to return to point A while tasking a second UAS to launch from point A and complete the cargo retrieval.

Figure 3:
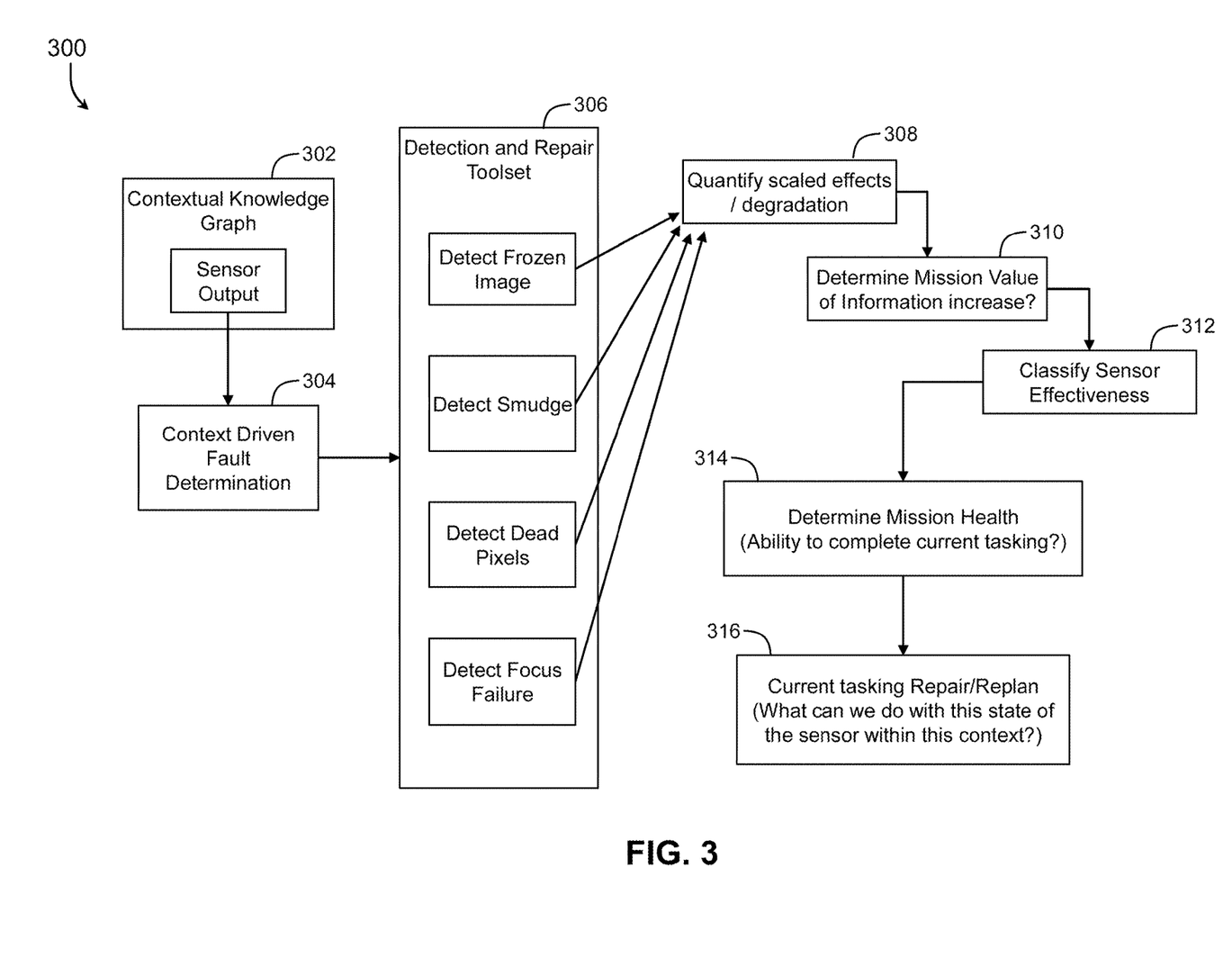
FIG. 3 is a diagram of a logic sequence exemplary of an embodiment of the inventive concepts disclosed herein.

FIG. 3

Referring now to FIG. 3, a diagram of a logic sequence 300 exemplary of an embodiment of the inventive concepts disclosed herein is shown. The logic sequence 300 may indicate one sequence the controller 120 may employ to determine sensor effectiveness and overall mission health.

In one embodiment, the system for sensor quality detection 100 may employ a sensor output knowledge graph 302 to continuously receive the actual sensor output and graph a performance over time. Using the context factors 118 the controller 120 may employ a context driven fault determination 304 and detection and repair toolset 306 to quantify the sensor degradation 308.

The controller 120 may determine value of the quantified sensor degradation 310 and classify the sensor effectiveness 312 in performing the assigned tasks. With reference to context factors 118 and the current tasking, the controller 120 may determine mission health 314 and employ current tasking repair and replan 316 to either continue with mitigation techniques to use the degraded sensor or transfer the current tasking to a second vehicle having an operational sensor 122.

Figure 4:
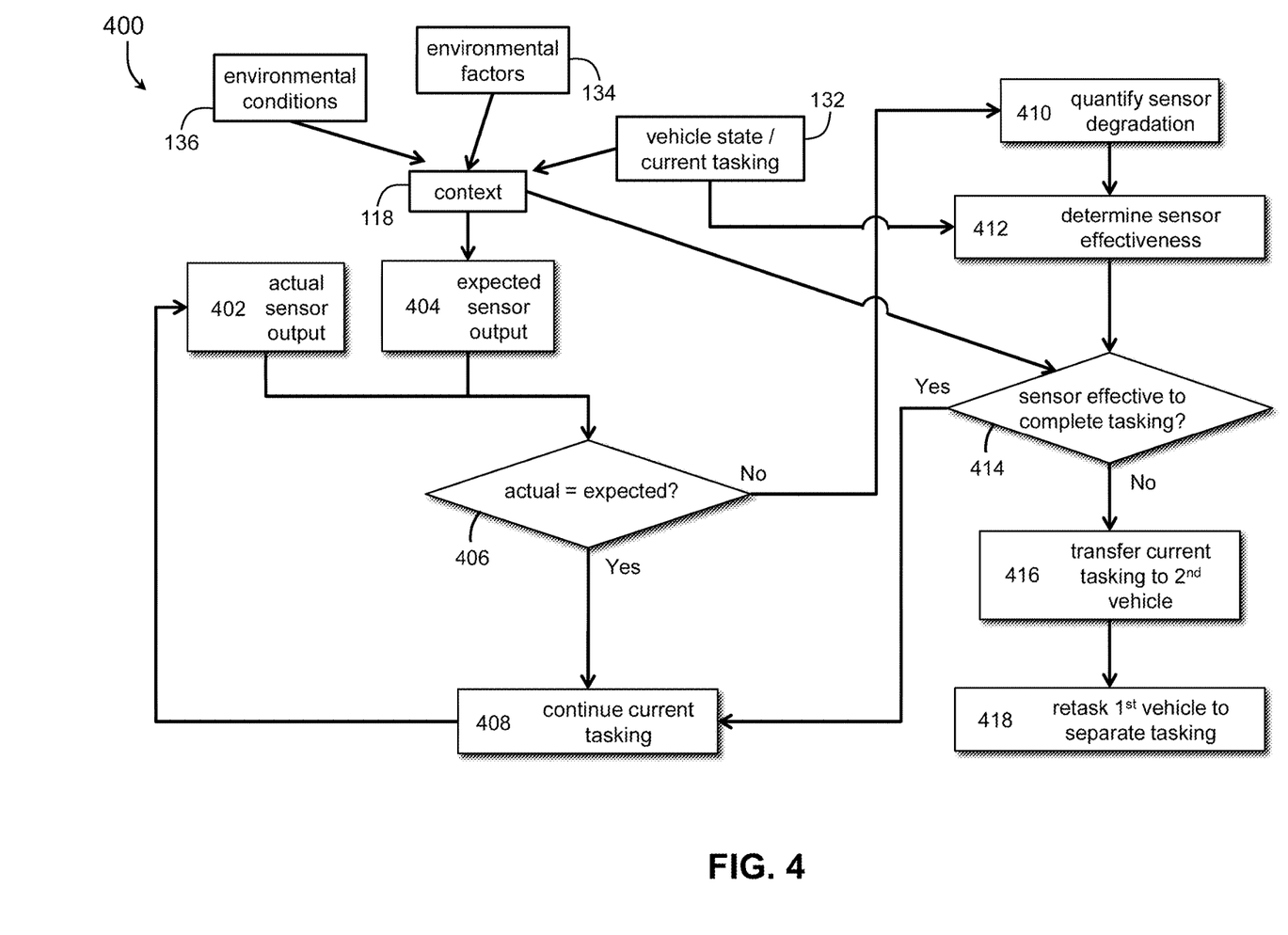
FIG. 4 is a diagram of a logic flow exemplary of one embodiment of the inventive concepts disclosed herein.

FIG. 4

Referring now to FIG. 4, a diagram of a logic flow 400 exemplary of one embodiment of the inventive concepts disclosed herein is shown. The system for sensor quality detection 100 may employ each of the context factors 118 to determine the expected sensor output 404. As the controller 120 may receive the actual sensor output 402 it may then analyze and compare the expected to actual sensor output at step 406 to determine if there is any sensor degradation. With no difference, the logic may pass to a step 408 to continue the current tasking, However, if the controller 120 detects a difference, a step 410 may quantify the degradation and, with current tasking included in the contextual decision, the controller 120 may determine a sensor effectiveness 412 to complete the current task.

A query 414 may detail the controller 120 determination of sensor effectiveness to complete the tasking given the current quantified degradation in light of the current context factors 118. A step 416 may transfer the current tasking to a second vehicle should the result of query 414 be negative while a positive result from query 414 may return the logic back to the step 408 with the first vehicle continuing the current tasking. Once the current tasking is transferred to the second vehicle, a step 418 may retask the first vehicle with a separate tasking to enable efficient use of assets.

Figure 5:
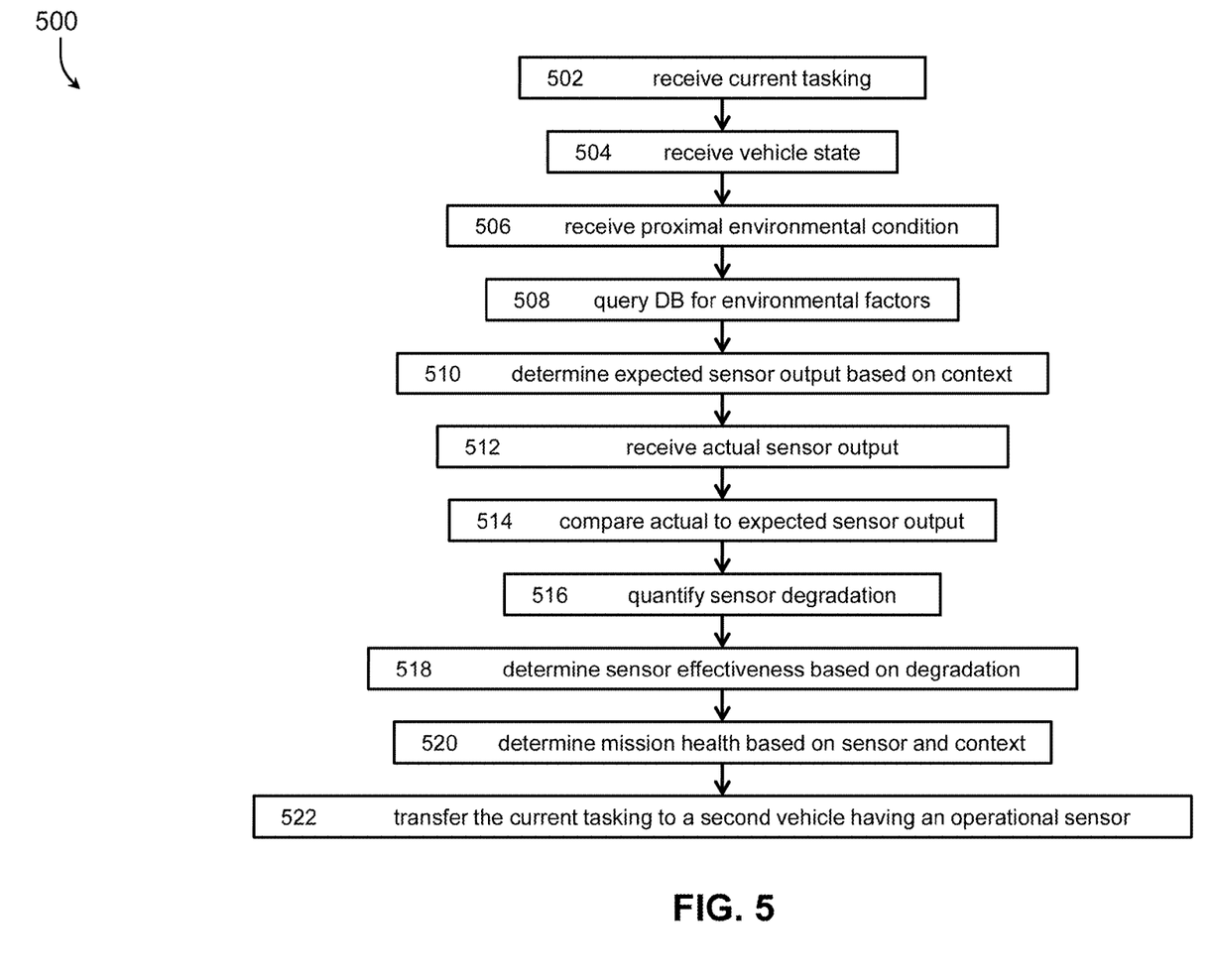
FIG. 5 is a diagram of a method flow in accordance with one embodiment of the inventive concepts disclosed herein.

FIG. 5

Referring now to FIG. 5, a diagram of a method flow 500 in accordance with one embodiment of the inventive concepts disclosed herein is shown. At step 502 the method may include receiving, onboard a first vehicle, a current tasking assigned to the first vehicle, the current tasking including a task assigned to the first vehicle, the current tasking associated with an employment of the sensor onboard the first vehicle and, at a step 504, the method may include receiving, onboard the first vehicle, a state variable associated with the first vehicle.

A step 506 may include receiving, onboard the first vehicle, an environmental condition proximal with the first vehicle, the an environmental condition one of: received via a communication system onboard the first vehicle and sensed by an environmental sensor onboard the first vehicle and, at a step 508, querying a database of environmental factors, onboard the first vehicle, for an environmental factor.

A step 510 may include determining an expected output from the sensor onboard the first vehicle based on each of: 1) the current tasking, 2) the received state variable of the first vehicle, 3) the received environmental condition, and 4) the environmental factor while a step 512 may include receiving an actual output from the sensor.

A step 514 may include comparing the actual output to the expected output, and at a step 516, the method may include quantifying a degradation of the sensor based on the comparison. A step 518 may include determining a sensor effectiveness of the sensor based on the quantified degradation and the task assigned to the first vehicle and a step 520 may include determining a mission health of the current tasking based on 1) the sensor effectiveness of the sensor, 2) the state variable of the first vehicle, 3) the environmental condition, 4) the environmental factor, and 5) the current tasking, the mission health a measurement of sensor effectiveness in completing the current tasking with the quantified degradation of the sensor. A step 522 may include transferring the current tasking to a second vehicle having an operational sensor capable of performing the current tasking if the determined mission health falls below a predetermined value.

CONCLUSION

As will be appreciated from the above description, embodiments of the inventive concepts disclosed herein may provide a novel solution to detect a context driven quality of a specific sensor allowing for accurate decisions for sensor and vehicle operation.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A system for sensor quality detection, comprising:
  at least one sensor sited onboard a first vehicle;
  at least one state sensor onboard the first vehicle configured to measure at least one state variable associated with the first vehicle;

at least one environmental sensor onboard the first vehicle configured to measure at least one environmental condition proximal with the first vehicle;

a database of environmental sensor performance factors onboard the first vehicle associated with an expected performance of the at least one sensor, the expected performance based on at least one environmental sensor performance factor within the database of environmental sensor performance factors;

a communication system onboard the first vehicle, the communication system configured at least to receive one of the at least one environmental condition;

a controller operatively coupled with the at least one sensor, the at least one state sensor, the at least one environmental sensor, the database of environmental sensor performance factors, and the communication system;

a tangible, non-transitory memory configured to communicate with the controller, the tangible, non-transitory memory having instructions stored therein that, in response to execution by the controller, cause the controller to:

receive a current tasking of the first vehicle, the current tasking at least one task assigned to the first vehicle;

receive, from the at least one state sensor, the at least one state variable of the first vehicle;

receive from the at least one environmental sensor the at least one environmental condition;

receive from the database of environmental sensor performance factors, the at least one environmental sensor performance factor;

determine an expected output from the at least one sensor based on each of: 1) the current tasking, 2) the at least one state variable of the first vehicle, 3) the at least one environmental condition, and 4) the at least one environmental sensor performance factor;

receive an actual output from the at least one sensor;

compare the actual output to the expected output;

quantify a degradation of the at least one sensor based on the comparison;

determine a sensor effectiveness of the at least one sensor based on the quantified degradation and the at least one task assigned to the first vehicle;

determine a mission health of the current tasking based on the 1) the sensor effectiveness of the at least one sensor, 2) the at least one state variable of the first vehicle, 3) the at least one environmental condition, 4) the at least one environmental sensor performance factor, and 5) the current tasking, the mission health a measurement of sensor effectiveness in completing the current tasking with the quantified degradation of the at least one sensor; and transfer the current tasking to a second vehicle having an operational sensor capable of performing the current tasking if the determined mission health falls below a predetermined value.

2. The system for sensor quality detection of claim 1, wherein the at least one sensor further comprises one of an optical sensor, and electro optical sensor, an electromagnetic sensor, a radio frequency sensor, a laser imaging detection and ranging (LIDAR) sensor, a radar sensor, a multi-spectral situational awareness sensor, a radar warning receiver (RWR), a laser warning receiver (LWR), a radio frequency countermeasures sensor (RFCM), a weather sensor, a pitot static sensor, and an infrared sensor.

3. The system for sensor quality detection of claim 1, wherein the first vehicle and the second vehicle include one of: an aerospace vehicle, an expeditionary modular autonomous vehicle (EMAV), a manned and unmanned aerospace vehicle, a manned and unmanned surface vehicle, a manned and unmanned subsurface vehicle, a military vehicle, and a transport vehicle.

4. The system for sensor quality detection of claim 1, wherein the at least one state sensor further comprises one of: an altimeter, an inertial sensor, a position sensor, a positioning system, a heading sensor, an airspeed sensor, a groundspeed sensor, and an attitude sensor.

5. The system for sensor quality detection of claim 1, wherein the at least one state variable further comprises at least a position, an airspeed, a ground speed, a heading, an altitude, a vibration, the current tasking, a vehicle intent, a pitch, a roll, a yaw, and an acceleration.

6. The system for sensor quality detection of claim 1, wherein the at least one environmental condition proximal with the first vehicle further comprises one of a temperature, a humidity, a wind, a cloud state, a sea state, a fog, a visibility, a rain event, and a snow event.

7. The system for sensor quality detection of claim 1, wherein the at least one environmental sensor performance factor further includes at least one of a date, a time, a geography, a threat level, an engagement status, a terrain, a relative sun position and angle, a relative moon position and angle, an illumination, and a radio frequency signature.

8. The system for sensor quality detection of claim 1, wherein the communication system is configured for a bidirectional data communication and further includes one of a data link and an automated dependent surveillance broadcast (ADS-B) capability.

9. The system for sensor quality detection of claim 1, wherein the current tasking further includes at least one of a transport mission, a surveillance mission, a combat mission, a mapping mission, and a reconnaissance mission.

10. The system for sensor quality detection of claim 1, wherein the expected output from the at least one sensor includes a scaled sensor anticipated performance based on the at least one environmental sensor performance factor.

11. The system for sensor quality detection of claim 1, wherein transfer the current tasking to the second vehicle further includes a retask of the first vehicle to perform a separate tasking within the sensor effectiveness of the at least one sensor.

12. The system for sensor quality detection of claim 1, wherein quantify a degradation of the at least one sensor based on the comparison further comprises a scaled score of the actual output from the at least one sensor based on an actual sensor performance.

13. The system for sensor quality detection of claim 1, wherein determine the mission health of the current tasking is further based on a collaboration with an offboard mission reasoner via the communication system.

14. A method for sensor quality detection, comprising:

receiving, onboard a first vehicle, a current tasking assigned to the first vehicle, the current tasking including at least one task assigned to the first vehicle, the current tasking associated with an employment of at least one sensor onboard the first vehicle;

receiving, onboard the first vehicle, at least one state variable associated with the first vehicle;

receiving, onboard the first vehicle, at least one environmental condition proximal with the first vehicle, the at least one environmental condition one of: received via a communication system onboard the first vehicle and sensed by at least one environmental sensor onboard the first vehicle;

querying a database of environmental sensor performance factors, onboard the first vehicle, for at least one environmental sensor performance factor;

determining an expected output from the at least one sensor onboard the first vehicle based on each of: 1) the current tasking, 2) the at least one state variable of the first vehicle, 3) the at least one environmental condition, and 4) the at least one environmental sensor performance factor;

receiving an actual output from the at least one sensor;

comparing the actual output to the expected output;

quantifying a degradation of the at least one sensor based on the comparison;

determining a sensor effectiveness of the at least one sensor based on the quantified degradation and the at least one task assigned to the first vehicle;

determining a mission health of the current tasking based on 1) the sensor effectiveness of the at least one sensor, 2) the at least one state variable of the first vehicle, 3) the at least one environmental condition, 4) the at least one environmental sensor performance factor, and 5) the current tasking, the mission health a measurement of sensor effectiveness in completing the current tasking with the quantified degradation of the at least one sensor; and transferring the current tasking to a second vehicle having an operational sensor capable of performing the current tasking if the determined mission health falls below a predetermined value.

15. The method for sensor quality detection of claim 14, wherein determining the mission health of the current tasking is further based on a collaboration with an offboard mission reasoner via the communication system.

* * * * *